(12) United States Patent
Youssef et al.

(10) Patent No.: US 6,488,469 B1
(45) Date of Patent: Dec. 3, 2002

(54) MIXED FLOW AND CENTRIFUGAL COMPRESSOR FOR GAS TURBINE ENGINE

(75) Inventors: Nashed Youssef, Mississauga (CA); Gary Weir, Toronto (CA)

(73) Assignee: Pratt & Whitney Canada Corp., Longueil (CA)

( * ) Notice: Subject to any disclaimer, the term of this patent is extended or adjusted under 35 U.S.C. 154(b) by 74 days.

(21) Appl. No.: 09/680,281

(22) Filed: Oct. 6, 2000

(51) Int. Cl.[7] .................................................. F01D 1/06
(52) U.S. Cl. ..................... 415/143; 415/181; 415/198.1; 415/199.2; 415/199.6; 415/208.2; 415/211.2; 60/804
(58) Field of Search .................................. 415/143, 181, 415/198.1, 199.1–199.6, 208.2, 211.2; 416/198 A, 201 R; 60/804

(56) References Cited

U.S. PATENT DOCUMENTS

| | | | | |
|---|---|---|---|---|
| 2,640,319 A | * | 6/1953 | Wislicenus | 60/684 |
| 2,943,839 A | * | 7/1960 | Birmann | 415/143 |
| 3,941,499 A | * | 3/1976 | Kronogard | 415/199.6 |

FOREIGN PATENT DOCUMENTS

| | | | | |
|---|---|---|---|---|
| FR | 972751 A | * | 2/1951 | 415/143 |
| GB | 585084 A | * | 1/1947 | 415/143 |

* cited by examiner

Primary Examiner—Christopher Verdier

(57) ABSTRACT

A two stage compressor for a gas turbine engine with a mixed flow first stage, a centrifugal second stage, and an intermediate duct. The mixed flow stage has a mixed rotor rotatable about the central compressor axis with a circumferential array of mixed flow blades between the mixed flow hub and an associated mixed flow shroud. The downstream centrifugal stage has a centrifugal rotor rotatable about the same compressor axis. The centrifugal rotor has a circumferential array of radially extending centrifugal flow blades between the centrifugal flow hub and an associated centrifugal flow shroud. An intermediate duct has an inner duct wall defining an axially curvilinear transition surface of revolution between an outlet end of the mixed flow hub and an inlet end of the centrifugal flow hub and an outer duct wall defining an axially curvilinear transition surface of revolution between an outlet end of the mixed flow shroud and an inlet end of the centrifugal flow shroud. Preferably, the intermediate duct has a median inlet radius greater than an intermediate duct median outlet radius whereby air flow from the mixed rotor is directed radially inwardly and axially rearwardly toward the centrifugal rotor.

8 Claims, 3 Drawing Sheets

MIXED FLOW AND CENTRIFUGAL COMPRESSOR FOR GAS TURBINE ENGINE

TECHNICAL FIELD

The invention relates to a two stage compressor for a gas turbine engine with a mixed flow first stage, a centrifugal second stage, and an intermediate diffusing duct.

BACKGROUND OF THE ART

Although mixed flow, or diagonal flow, compressors are well known to those skilled in the art of gas turbine engine design, the commercial adoption of mixed flow compressors, particularly in aircraft engines, has been very limited. Most aircraft engines to-date utilise axial flow compressor rotors, centrifugal flow compressors or a combination of both.

The configuration and design of axial flow compressors and centrifugal flow compressors is considered very well known in the art and it is only necessary here to present a general outline of their features and advantages or disadvantages.

Large diameter gas turbine engines are generally constructed with multiple exclusively axial stages generally arranged downstream of an intake fan and by-pass duct. In conventional engines the low pressure axial compressor is mounted on the same shaft as the fan and a low pressure turbine, and the high pressure compressor rotors are mounted on a coaxial high pressure shaft driven by a high pressure turbine. Understandably these multiple stage axial compressors are large and complex machines. They can be justified for their high efficiency in high thrust engine constructions.

Smaller engines are sometimes constructed with a centrifugal compressor as the terminal high pressure stage with a series of axial low pressure stages upstream. The centrifugal rotor, together with surrounding diffuser ducts, considerably increases and dictates the maximum diameter of the engine and forward surface area. However, especially in smaller engine designs, the centrifugal compressor provides high efficiency and reduces the axial length of the engine at the expense of an increase in the radial dimension.

A third common compressor structure includes two centrifugal compressor rotors; however, commercial adoption of this compressor design is very limited. The duct work required to convey compressed air from the first stage centrifugal compressor to the second stage centrifugal compressor rotor is very complex, difficult to manufacture accurately and assemble. Multiple centrifugal stages subject the engine to a significant weight and air drag penalty with prohibitively increased diameter. The increased bulk of the engine envelope and loss of compressor efficiency, through the complex ducting required between first and second stages, has severely limited the adoption of a two stage centrifugal compressor.

The common combination of a centrifugal compressor with axial low pressure stage also suffers from several disadvantages that are generally accepted by designers as inevitable. The engine envelope diameter is dictated by the centrifugal compressor and surrounding diffuser. The axial compressor is often constructed of two or more axial rotors with stator blade assemblies between each axial stage. As a result the number of blades and rotors significantly adds cost to the engine and mechanical complexity. In the current economy for gas turbine engines the overall engine price has been dropping relative to inflation, whereas the cost of materials and engine design costs have been rising. For example, the cost of titanium used in the axial compressor blades has tripled in the last ten years. Due to high design costs for such complex machine parts, the expedient of conservative design practices has resulted in heavier, more robust blades to ensure an adequate safety margin. Therefore, although the design and construction of axial compressors is well known, increases in material costs and concern over the high cost of designing these compressors has led to a desire for a less complex and economically efficient compressor design.

In general, the fewer rotor stages and stator stages that are required in a compressor, the better. Multiple stages and highly complex geometries significantly increase the costs of compressors. To-date, however, experiments in adopting diagonal flow or mixed flow compressor blades have been inconclusive. For example there is no production gas turbine engine available with a mixed flow compressor to date, although experimental results are well documented.

It is well recognised that the cost and reliability of modern gas turbine engines is significantly determined by the number of compressor stages, or acceleration/diffusion operations within the compressor section. It is long recognised that reducing the number of compressor stages will have beneficial effect on the cost of this equipment. Although centrifugal compressor stages compared with axial flow compressors offer lower cost and higher static pressure ratio, centrifugal compressors are slightly less efficient and penalise the design with a larger outer engine envelope diameter than a comparable axial flow compressor. The axial flow compressor of course has a longer axial dimension but suffers from a lower resistance to foreign object damage as well as a lower tolerance to distortion and non-uniformity of inlet airflow distribution. On the other hand using multiple centrifugal compressor stages occasions large aerodynamic losses in the duct work required between the stages as well as significant penalties in weight, engine complexity and manufacturing costs.

Mixed flow or diagonal flow, compressor stages have been recognised in the prior art as providing advantages over both the axial flow and centrifugal flow compressors. For example, a mixed flow compressor has a more rugged design which is superior in foreign object damage resistance to an axial flow compressor and the length of blades enable designers to increase the blade width significantly strengthening the mixed flow blades in comparison to axial flow blades. In addition the part speed benefits of a mixed flow compressor with a significant radius change reduces stress, increases part and bearing life when compared with a large diameter centrifugal compressor rotor. The manufacturing of a mixed flow compressor rotor is somewhat simplified in comparison to a centrifugal compressor and the increase in diameter is significantly lessened.

An example of an adoption of a mixed flow compressor rotor is shown in U.S. Pat. No. 4,678,398 to Dodge et al. In this example the mixed flow compressor rotor is positioned as the first stage upstream of a flow splitter by-pass duct and high pressure axial flow compressor. The mixed flow rotor positioned at the engine inlet with relatively rugged blade construction increases the resistance to foreign object damage and fully utilises the centrifugal effect to propel foreign objects radially outwardly through the by-pass duct thereby protecting the high pressure axial compressor sections downstream.

A significant limitation of the Dodge mixed flow compressor however, is the stat ed objectives which inevitably result in transonic/supersonic air flow speeds in the compressor. The design parameters limit the engine envelope to be comparable to that of an axial flow compressor whereas the design objective is to attain the static pressure ratio, cost and inlet resistance to foreign object damage of a centrifugal compressor. In order to obtain these objectives however, Dodge approaches the mixed flow compressor design by requiring transonic velocities and deals with the need to accommodate sonic shock waves within the structure.

Another example of an attempt to replace several axial compressor stages with a single mixed flow compressor stage as a cost reduction is shown in a paper entitled "Mixed-Flow Compressor Stage Design and Test Results with a Pressure-Ratio of 3:1" Musgrave, D. S. and Plehn, N. J. presented at Gas Turbine Conference and Exhibition, Anaheim, Calif. May 31, to Jun. 4, 1967. In this example the mixed flow compressor stage was designed to be the terminal stage behind an upstream multi-stage axial compressor. The mixed flow compressor stage has an advantage over a conventional centrifugal stage compressor in that the envelope radius is significantly reduced.

A further example of utilisation of a mixed flow compressor is shown in a paper entitled "Design and Rotor Performance of a 5:1Mixed-flow Supersonic Compressor" by Monig, R., Elmdorf, W. and Gallus, H. E. presented at International Gas Turbine and Aeroengine Congress and Exposition, Cologne, Germany Jun. 1–4, 1992. This paper and experimental results deal extensively with the need to stabilise shock waves within the diagonal or mix flow compressor passage. Strong sonic shock waves significantly reduce efficiency to 75%. Although a relatively high 5:1 compression ratio is achieved, this type of design is impractical due to high stresses from the rapid rotor speed and sonic shock waves.

It is an objective of the present invention to provide a sub-sonic mixed flow compressor stage to derive benefits from low part speeds, resulting low stresses, longer part life and foreign object damage resistance of a mixed flow compressor as well as the increased work capacity derived by significant radius changes in comparison to an axial flow compressor.

It is a further object of the invention to replace several upstream low pressure axial stages with a single mixed flow stage thereby reducing the cost of part manufacturing, engine assembly and maintenance of the compressor.

It is a further object of the invention to provide a mixed flow compressor and intermediate duct upstream of a centrifugal compressor to achieve a combined pressure ratio in the order of 10:1 to 13:1.

Further objects of the invention will be apparent from review of the disclosure, drawings and description of the invention below.

DISCLOSURE OF THE INVENTION

The invention provides a two stage compressor for a gas turbine engine with a mixed flow first stage, a centrifugal second stage, and an intermediate duct.

The mixed flow stage has a mixed rotor rotatable about the central compressor axis with a circumferential array of mixed flow blades between the mixed flow hub and an associated mixed flow shroud.

The downstream centrifugal stage has a centrifugal rotor rotatable about the same compressor axis and possibly but not necessarily on the same shaft. The centrifugal rotor has a circumferential array of radially extending centrifugal flow blades between the centrifugal flow hub and an associated centrifugal flow shroud.

An intermediate duct has an inner duct wall defining an axially curvilinear transition surface of revolution between an outlet end of the mixed flow hub and an inlet end of the centrifugal flow hub, and an outer duct wall defining an axially curvilinear transition surface of revolution between an outlet end of the mixed flow shroud and an inlet end of the centrifugal flow shroud. Preferably, the intermediate duct has a median inlet radius greater than an intermediate duct median outlet radius whereby air flow from the mixed rotor is directed radially inwardly and axially rearwardly toward the centrifugal rotor.

The compressor arrangement has several advantages over prior art compressors. A significant advantage of the invention is the replacement of several axial compressor stages with a single mixed flow stage. Significant savings are achieved in reduction of manufacturing costs and maintenance as well as the axial dimension of the engine is reduced. A sub-sonic mixed flow compressor has the advantage of being more efficient than a supersonic compressor stage as described in the prior art.

The potential for rugged blade design of mixed flow compressor reduces material and manufacturing costs over several axial stages, and reduces stress and increases part life in comparison to a centrifugal compressor rotor. Where utilising two centrifugal compressor stages is impractical and inefficient due to the complex duct work and flow losses in the ducts, using a mixed flow compressor stage upstream of a centrifugal compressor stage eliminates complex duct work while maintaining a benefit of additional work in providing a radial flow of air.

The intermediate duct between the first stage mixed flow and second stage centrifugal flow enables the designer to reduce the inlet diameter of the centrifugal stage. As a result of redirecting the airflow radially inwardly during diffusion and reduction of swirl the diameter of the centrifugal impeller can be reduced thereby reducing stresses in the material of the impeller. The intervening duct may include a single row of stator blades thereby reducing complexity and manufacturing costs, but the scope of the invention is not necessarily limited to single row of stators.

Significantly the shock losses and low efficiency of transonic compressors of the prior art have been overcome by ensuring that the outlet flow from the mixed flow compressor has a subsonic absolute velocity and in addition the intervening duct reduces swirl and diffuses the exit airflow from the mixed stage for introduction at a low relative velocity to the centrifugal compressor inlet. None of the prior art consider this combination of a subsonic mixed flow compressor upstream of a centrifugal compressor. In particular, the prior art does not contemplate severely limiting the compression ratio of a mixed flow first stage in order to combine the mixed flow compressor stage with a terminal centrifugal compressor stage.

Further advantages of the invention will be apparent from the following detailed description and accompanying drawings.

DESCRIPTION OF THE DRAWING

In order that the invention may be readily understood, one embodiment of the invention is illustrated by way of example in the accompanying drawing.

Further details of the invention and its advantages will be apparent from the detailed description included below.

DETAILED DESCRIPTION OF PREFERRED EMBODIMENTS

Figure 1:
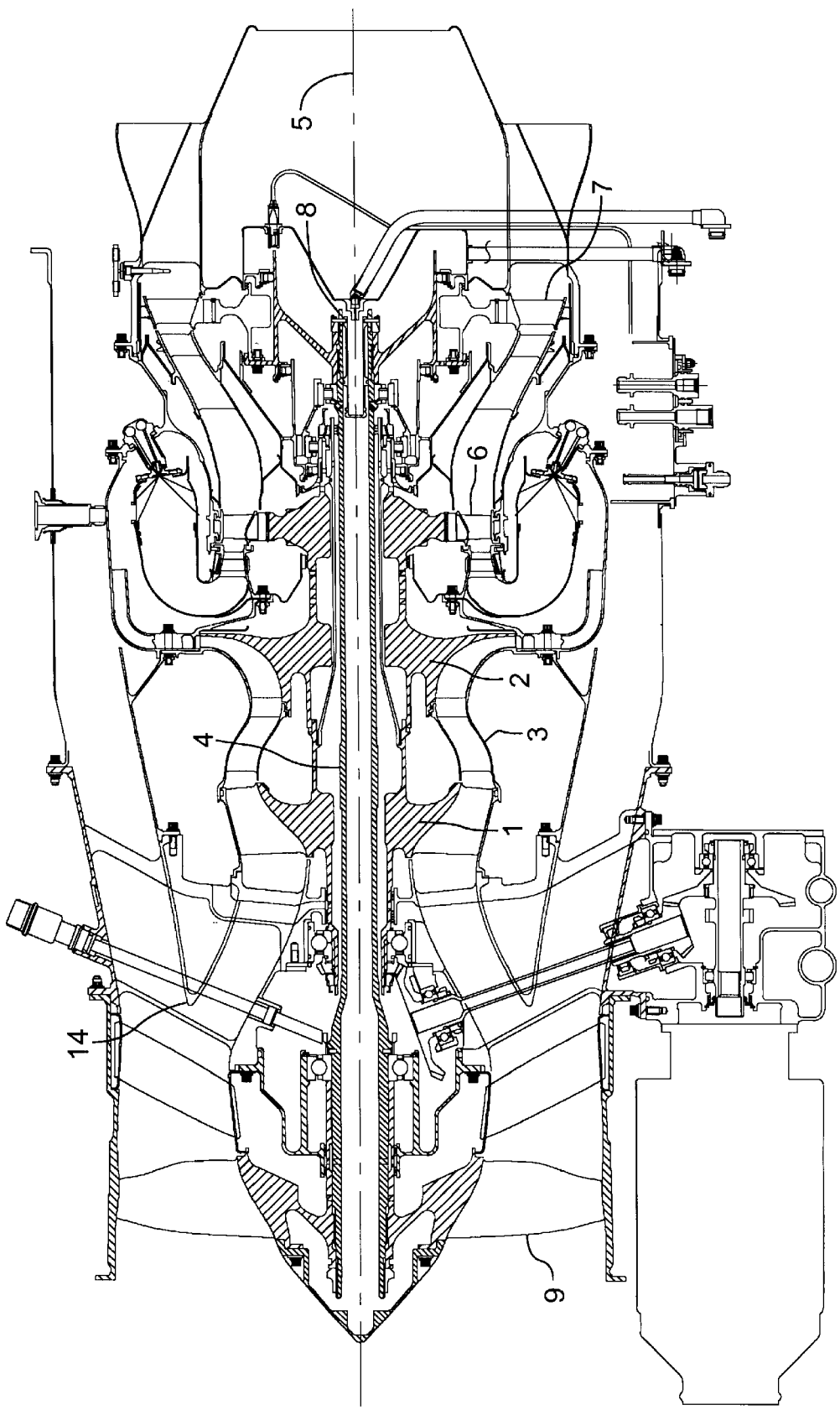
FIG. 1 is an axial sectional view through a turbofan engine embodiment of the invention with two stage mixed and centrifugal compressor.

FIG. 1 is an axial cross-section through a first embodiment of the invention showing a radically simplified turbofan gas turbine engine with mixed flow compressor rotor 1, centrifugal compressor rotor 2 and intermediate duct 3.

Figure 3:
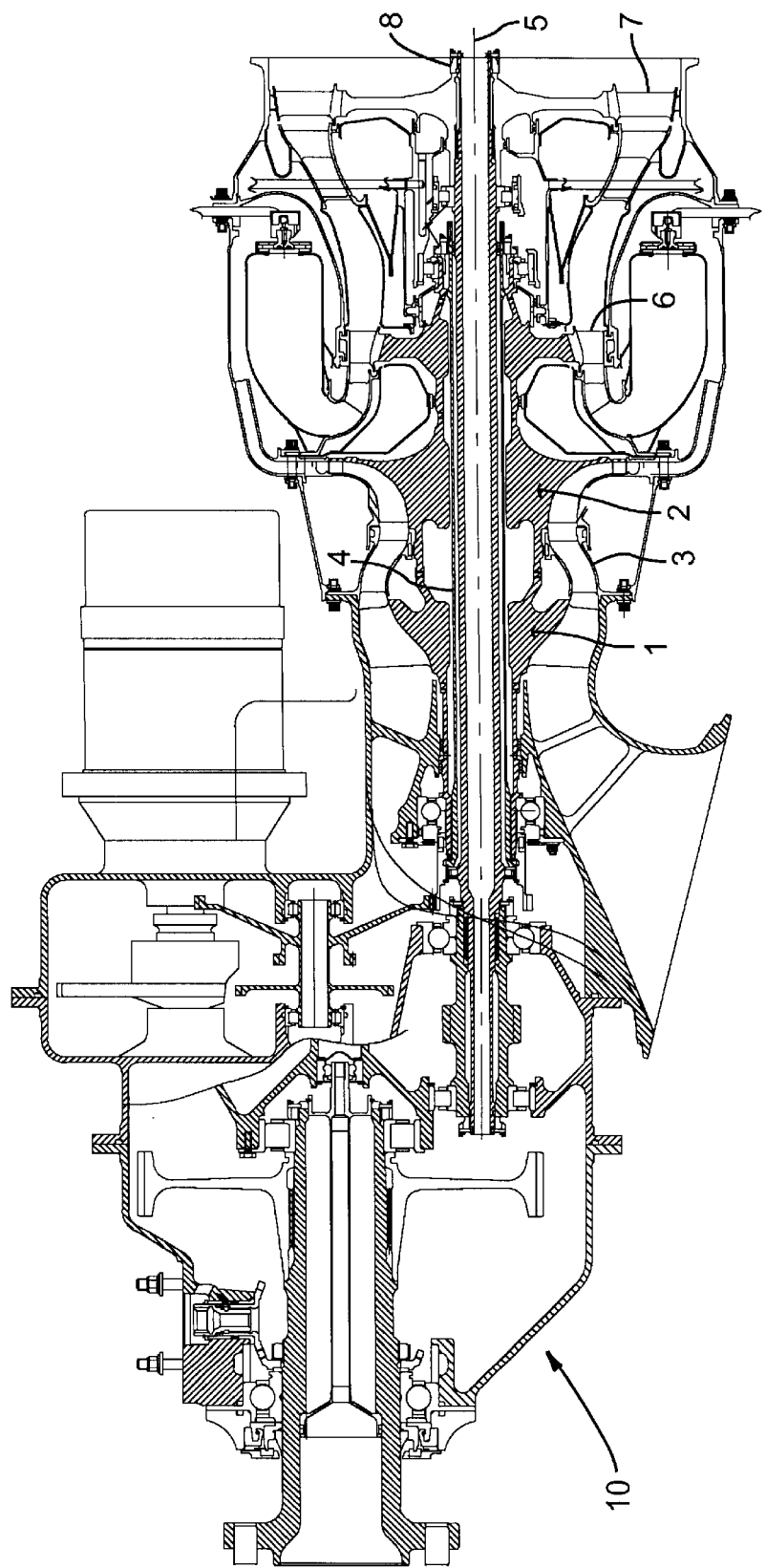
FIG. 3 is an axial sectional view through a turboprop engine embodiment, also with two stage mixed and centrifugal compressor.

FIG. 3 is a like axial cross-section through a second embodiment of the invention showing a turboprop gas turbine engine with the same mixed flow compressor rotor 1, centrifugal compressor rotor 2 and intermediate duct 3. The invention is equally applicable to turbo-shaft engines, any other gas turbine engine or gas compressor.

In both example embodiments, the mixed flow rotor 1 and centrifugal flow rotor 2 are mounted to a common high pressure shaft 4 and rotate about the central compressor and engine axis 5. The single high pressure turbine 6 drives the high pressure shaft 4 and compressor rotors 1 and 2, whereas a single low pressure turbine 7 drives a low pressure shaft 8 with forward mounted fan 9 or gear reducer/main drive 10. It is not necessary, however, for the mixed flow rotor 1 and the centrifugal rotor 2 to be mounted on the same shaft 4, since the invention is equally applicable to other engine configurations as well.

Figure 2:
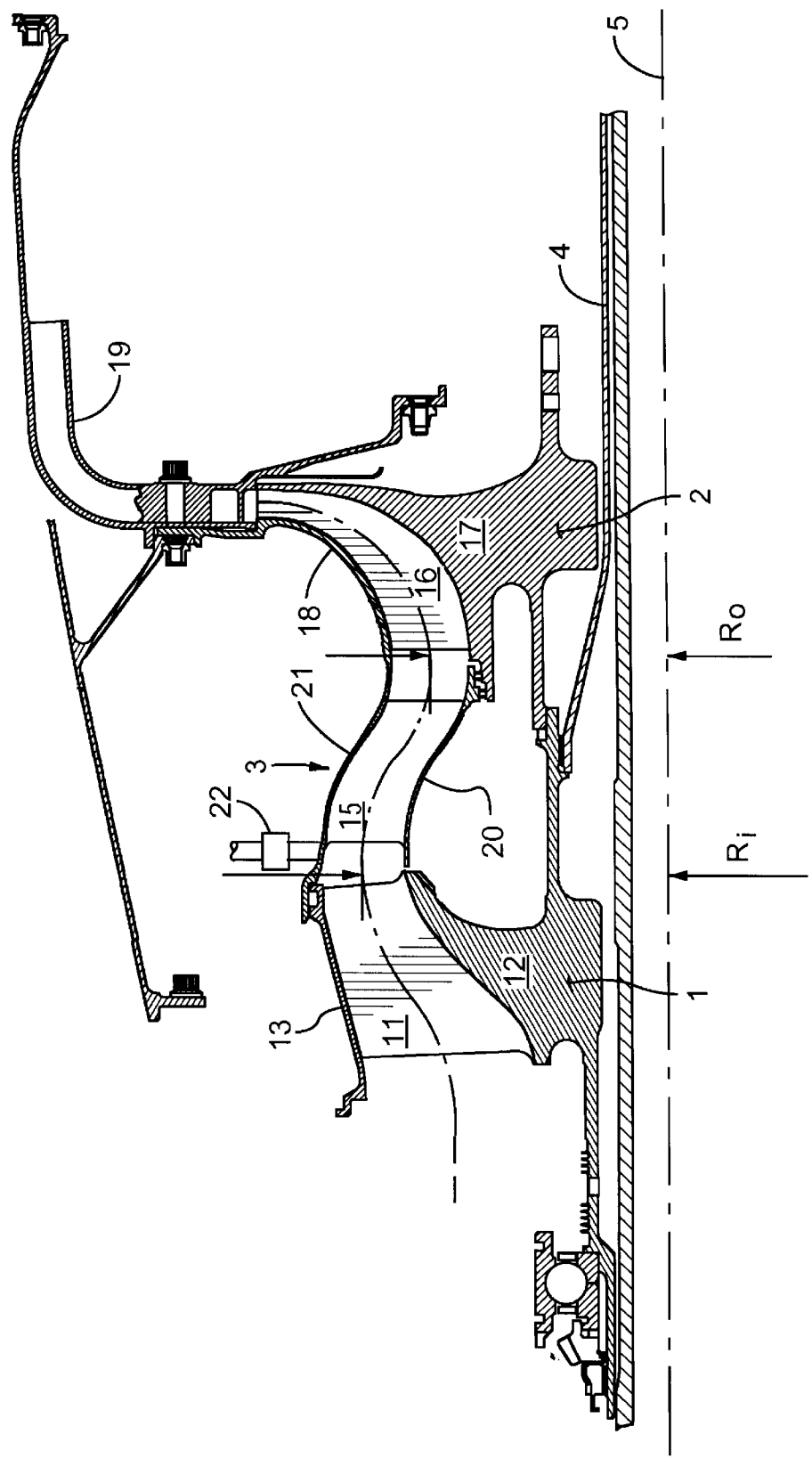
FIG. 2 is an axial detail sectional view through a the mixed rotor blade, hub and shroud and through the centrifugal rotor blade, hub and shroud.

As shown best in FIG. 2, the invention relates to a novel arrangement including a mixed flow or diagonal flow first compressor stage that replaces multiple conventional axial flow compressor stages. The axial length of the first compressor stage is significantly reduced without a corresponding increase in the radial extent of the engine envelope as experienced when multiple axial stages are replaced with a centrifugal compressor. In addition, the relatively short smooth transition within the intermediate duct 3 (between mixed and centrifugal rotors 1 and 2) does not introduce severe air flow efficiency losses or increased engine bulk, as experienced when multiple centrifugal rotors are joined in series with long and complex ducts.

The mixed flow rotor 1 has a circumferential array of mixed flow blades 11 extending between the hub 12 of the mixed flow rotor 1 and the surrounding mixed flow shroud 13. The mixed flow stage has an increased pressure ratio in comparison to a single axial stage as recognised by those skilled in aerodynamics due to the radial component of air flow and relatively long mixed flow blades 11. From a mechanical viewpoint, the relatively long length of the mixed flow blades 11 permits blades 11 with a large width, since optimal airfoil length and width are proportional, resulting in very rugged blades 11 that offer superior resistance to flying object damage, as well as longer blade and bearing life compared to axial blades, and lower blade stress due the part speed benefits compared to centrifugal compressor rotors.

The replacement of multiple axial stages, including rotors and stators, with a single mixed flow stage has obvious economical benefit in reducing manufacturing, assembly and maintenance costs simply because there are significantly less parts to deal with. The reduction of overall compressor weight is possible depending on the specific design of the mixed flow stage and duct 3 compared to axial flow alternatives. A more subtle benefit of the mixed flow stage is the increased resistance to flying object damage to the engine core and compressor blades due to the extended distance between the bypass flow splitter 14 (see turbofan engine embodiment FIG. 1) and the leading edge of the first compressor stage blades 11 combined with the rugged large width elongated mixed flow blade structure 11.

Mixed flow rotors 12 due to the blade length and radial airflow component require a significantly lower rotational speed in comparison to an axial flow rotor to achieve the same pressure ratio. Such part speed benefits result in longer bearing life, decreased material stress resulting in longer blade life, and reduced abrasion from fine airborne particles (such as sand ingested into helicopter engines).

Unlike the mixed flow compressors described in the prior art mentioned above, the mixed flow stage of the invention is intentionally limited to subsonic airflow speeds at the exit from the mixed flow rotor 1. The prior art designs based on supersonic airflow speeds impose severe efficiency penalties due to shock losses and increase the structural demands on the engine. These disadvantages of the prior art are likely the reasons why mixed flow compressors have not progressed from the experimental stage to the production engine stage to date.

The adoption of a mixed flow compressor stage of practical efficiency for non-military use (i.e. with commercially viable fuel economy and maintenance demands) requires that subsonic airflow speeds be maintained to avoid the high shock losses associated with supersonic compressors of the prior art. Accordingly the present invention limits the gas outlet absolute velocity of the mixed flow stage to between 0.75 and 0.99 Mach.

The resulting compression ratio of the subsonic mixed flow stage is in the range of between 2.0:1 and 3.5:1. This compression ratio is severely reduced compared to the prior art supersonic mixed flow compressors with compression ratio in the order of between 3.0:1 up to 6.0:1.

However, the basic design philosophy of the prior art is to achieve the highest possible compression ratio since the mixed flow stage is generally the terminal stage substituting for a centrifugal stage (with lower radius engine envelope, weight, airflow diversion) or serves to substitute for as many multiple axial flow stages as possible in an entirely axial flow compressor (with lower engine length, weight and mechanical complexity). The striving for maximum compression ratio has inevitably dictated the supersonic airflow speeds of the prior art and consequently has impeded the commercial adoption of mixed flow stages.

In contrast, the present invention purposely limits the mixed flow compressor stage to subsonic airflow speeds at the rotor exit, thereby to achieve a viable efficiency but at the cost of significantly lower compression ratio. The combining of the mixed flow stage with a terminal centrifugal stage however provides a viable combined compression ratio without the efficiency penalties of supersonic airflow speeds.

Where the mixed flow stage has a compression ratio of 2.0:1 to 3.5:1, in combination with a centrifugal compressor stage of reasonable compression ratio of 3.0:1 to 5.0:1 the resulting combined compression ratio is in the range of 6.0:1 to 17.5. Preliminary experimental results indicate a preferred mixed flow compression ratio of 2.5:1 to 2.9:1 and a centrifugal compression ratio in the range of 4.0:1 to 4.5:1 resulting in a conservative combined compression ratio in the order of 10.0:1 to 13.0:1.

The airflow speeds at the inlet of the centrifugal stage are likewise limited to minimise shock losses by the diffusing effect of the intermediate duct 3 and circumferential array of stator blades 15. As shown in FIG. 3, the centrifugal stage includes a centrifugal rotor 2 with circumferential array of blades 16 extending between the hub 17 and the mating shroud 18. FIG. 2 also shows a downstream pipe diffuser 19 surrounding the outlet periphery of the centrifugal rotor 2.

In order to limit the relative airflow speed at the inlet of the centrifugal rotor 2, the intermediate duct 3 is provided to diffuse airflow from the mixed flow rotor outlet and introduce air at the centrifugal rotor inlet at an absolute velocity in the order of 0.30 to 0.60 Mach. The rotation of the centrifugal rotor 2 adds a tangential vector component to axial air speed of the air exiting the duct 3 such that the average vector sum or relative air speed at the centrifugal rotor inlet does not significantly exceed 1.0 Mach.

In order to maximise the compression ratio of the mixed flow stage without incurring shock losses associated with supersonic airflow speeds, the outlet absolute airflow speed according to the invention approaches but does not exceed 1.0 Mach. To maintain a comfortable margin of safety, the mixed flow stage rotor speed, blade shroud and hub configuration are designed for an absolute gas outlet velocity in the range between 0.75 and 0.99 Mach. Likewise to maximise the compression ratio of the centrifugal stage without significant shock losses, the centrifugal stage inlet relative velocity is constrained so as not to significantly exceed 1.0 Mach. Due to the tangential airflow speed vector component introduced by the rotating centrifugal rotor 2, this design parameter limitation will generally require that the absolute gas inlet velocity be maintained within the range of 0.30 to 0.60 Mach. However, the specific engine configuration, rotor speeds and air path features of each engine application will lead to significant variation in the optimal range of absolute velocity although the optimal relative velocity will not significantly exceed 1.0 Mach.

The diffusing of air flow, reduction of swirl and efficient radially inward transition between the airflow exiting the mixed flow rotor 1 and entering the centrifugal flow rotor 2 is the function of the intermediate duct 3 and stator blades 15. The intermediate duct 3 has an inner duct wall 20 defining an axially curvilinear transition surface of revolution between an outlet end of the mixed flow hub 12 and an inlet end of the centrifugal flow hub 17. The outer duct wall 21 likewise defines an axially curvilinear transition surface of revolution between an outlet end of the mixed flow shroud 13 and an inlet end of the centrifugal flow shroud 18.

For maximum theoretical efficiency, the inlet of the centrifugal rotor 2 should be as close as possible to the axis of rotation 5, and the outlet of the mixed flow rotor 1 should be as far as possible from the same axis 5. To balance these influences, the practical solution of the invention is to provide an intermediate duct 3 with a median inlet radius "$R_i$" greater than the median outlet radius "$R_o$" of the duct 3 whereby air flow from the mixed rotor 1 is directed radially inwardly and axially rearward toward the centrifugal rotor 2.

Due to the airfoil shape of the stator blades 15, passage through the duct 3 results in diffusion of the air flow (i.e. reduction in speed and corresponding increase in static pressure). The blade 15 configuration can be augmented by increasing the radial distance between the inner and outer duct walls 20 and 21 as well. In each case the intermediate duct 3 has an annular inlet area smaller than the intermediate duct annular outlet area whereby air flow from the mixed rotor 1 is diffused during passage through the duct 3 to the centrifugal rotor 3.

The diversion of air through the duct 3 radially inwardly lengthens the air path compared to a straight axial air path. The stator blades 15 direct air flow from the mixed rotor 1 with a swirl in the range of 45° to 75° to the centrifugal rotor 2 with a reduced swirl in the range of 15° to 0°. As a result, significant swirl reduction and diffusion capability is provided in a smooth transition duct 3 within a relatively short axial length. To facilitate starting and handling the duct 3 includes a simple bleed valve 22 between the compressor stages.

Although the above description relates to a specific preferred embodiment as presently contemplated by the inventors, it will be understood that the invention in its broad aspect includes mechanical and functional equivalents of the elements described herein.

We claim:

1. A gas compressor having two stages comprising:
    a mixed flow stage with a mixed rotor rotatable about a compressor axis having a circumferential array of mixed flow blades between a mixed flow hub and an associated mixed flow shroud, wherein the mixed stage has: a gas outlet absolute velocity in the operating range of 0.75 to 0.99 Mach; and a compression ratio in the range of 2.5–2.9;
    a centrifugal stage with a centrifugal rotor rotatable about the compressor axis and downstream of the mixed rotor, the centrifugal rotor having a circumferential array of radially extending centrifugal flow blades between a centrifugal flow hub and an associated centrifugal flow shroud, wherein the centrifugal stage has: a gas inlet absolute velocity in the operating range of 0.30 to 0.60 Mach; and a compression ratio in the range of 4.0–4.5; and
    an intermediate duct having: an inner duct wall defining an axially curvilinear transition surface of revolution between an outlet end of the mixed flow hub and an inlet end of the centrifugal flow hub; and an outer duct wall defining an axially curvilinear transition surface of revolution between the outlet end of the mixed flow shroud and the inlet end of the centrifugal flow shroud.

2. A gas compressor according to claim 1 wherein the intermediate duct has a median inlet radius greater than the median outlet radius whereby air flow from the mixed rotor is directed radially inwardly and axially rearwardly toward the centrifugal rotor.

3. A gas compressor according to claim 2 wherein the intermediate duct has an annular inlet area less than an intermediate duct annular outlet area whereby air flow from the mixed rotor is diffused during passage through the duct to the centrifugal rotor.

4. A gas compressor according to claim 1 wherein the intermediate duct includes a circumferential array of stator blades.

5. A gas compressor according to claim 4 wherein the stator blades direct air flow from the mixed rotor with a swirl in the range of 45° to 75° to the centrifugal rotor with a swirl in the range of 15° to 0°.

6. A gas compressor according to claim 1 wherein the mixed rotor and centrifugal rotor are mounted to a common shaft.

7. A gas compressor according to claim 6 wherein the intermediate duct includes an air bleed.

8. A gas compressor according to claim 1 wherein the centrifugal stage has an average gas inlet relative velocity in the operating range of 0.75 to 1.10 Mach.

* * * * *